United States Patent [19]

Miyachi

[11] Patent Number: 4,982,526
[45] Date of Patent: Jan. 8, 1991

[54] MAT-LIKE LAWNGRASS FOR TRANSPLANTATION AND METHODS OF MANUFACTURE AND TRANSPLANTATION OF THE SAME

[75] Inventor: Yoshifumi Miyachi, Hiroshima, Japan

[73] Assignee: Sanyo Turk Co., Ltd., Hiroshima, Japan

[21] Appl. No.: 450,554

[22] Filed: Dec. 14, 1989

[30] Foreign Application Priority Data

Aug. 6, 1989 [JP] Japan ................................. 1-203568
Dec. 9, 1989 [JP] Japan ................................. 1-319580

[51] Int. Cl.$^5$ ............................................. A01G 1/00
[52] U.S. Cl. ............................................. 47/56; 47/9; 47/74; 47/58
[58] Field of Search .................... 47/9, 56, 31, 26, 74, 47/58

[56] References Cited

U.S. PATENT DOCUMENTS

| 4,023,506 | 5/1977 | Robey | 47/56 |
| 4,283,880 | 8/1981 | Fjeldsa | 47/9 |

FOREIGN PATENT DOCUMENTS

| 8503842 | 9/1985 | PCT Int'l Appl. | 47/56 |
| 8602804 | 5/1986 | PCT Int'l Appl. | 47/56 |

Primary Examiner—David A. Scherbel
Assistant Examiner—Jerrold D. Johnson
Attorney, Agent, or Firm—Oliff & Berridge

[57] ABSTRACT

The present invention provides mat-like lawngrass for transplantation, which comprises runner-like lawngrass obtained by fraying out sods and sandwiched between a net and a cover member and is obtained by placing the runner-like lawngrass with an adequate density on a net and then covering the runner-like lawngrass with a cover member consisting of a net or a sheet, as well as a method of manufacture of the same mat-like lawngrass and a method of transplanting lawngrass using the same mat-like lawngrass.

14 Claims, 3 Drawing Sheets

MAT-LIKE LAWNGRASS FOR TRANSPLANTATION AND METHODS OF MANUFACTURE AND TRANSPLANTATION OF THE SAME

BACKGROUND OF THE INVENTION

1. Field of the Invention

The present invention relates to mat-like lawngrass for transplantation, which can be readily transplanted and grown with a uniform density, as well as methods of manufacturing, transplanting and growing the same.

2. Description of the Prior Art

Usually, when growing and propagation lawngrass of vegetative propagation type, i.e., propagated not by seed propagation but by transplantation, such as zoysiagrasses (*Zoysia* Willd.), e.g., Japanese lawngrass (*Zoysia japonica* Steud) and Mascarenegrass (*Zoysia tenuifolia* Willd.) (hereinafter referred to as lawngrass) in golf lawn, gardens and like places where lawngrass is to be formed, lawngrass preliminarily grown in a lawngrass field or the like is cut to a suitable size, the cut lawngrass (i.e., sod) is then transported to the transplantation place, sods are then laid on ground at a suitable interval, then earth is topdressed on the space between adjacent sods, and then the entire sod array thus formed is thinly covered with soil for growth.

In this prior method, lawngrass is transplanted in the form of sods usually available in sizes of about 30 cm by 37 cm. To transport the sods to the destination, they are bound using ropes or the like into bound stacks each including several sods, which are transported on truck or the like. In addition, the transported sods have to be manually laid at a suitable interval for transplantation. The prior art method thus is entirely based on manual works taking man-hours and is very poorly efficient. Further, in the prior art method, lawngrass densely growing in a lawngrass field or the like is cut and then directly used. Therefore, lawngrass is used in a great quantity, thus dictating great costs for transportation and transplanting works in addition to the expenses for the lawngrass itself. Further, although there is a case where sods are laid closely to avoid any gap, a great quantity of lawngrass is necessary. Therefore, usually sods are laid at a suitable interval (i.e., with a suitable earth gap between adjacent sods). This means that the transplanted lawngrass is irregular before lawngrass grows on the earth gap with the same density as the transplanted sods, and until that time a golf lawn or the like can not be used.

The present invention seeks to provide mat-like lawngrass for transplantation which can solve the above problems.

SUMMARY OF THE INVENTION

An object of the present invention is to provide mat-like lawngrass for transplantation, which can be readily transplanted on an intended ground for quick growth and propagation to obtain uniform density grass.

Another object of the present invention is to provide a method of manufacture of such mat-like lawngrass for transplantation.

A still another object of the present invention is to provide a method of transplantation of such mat-like lawngrass for transplantation.

According to the present invention, there are provided mat-like lawngrass for transplantation, which comprises runner-like lawngrass obtained by fraying out sods and sandwiched between a net and a cover member and is obtained by placing the runner-like lawngrass with an adequate density on a net and then covering the runner-like lawngrass with a cover member consisting of a net or a sheet, as well as a method for manufacturing the same mat-like lawngrass and a method for transplanting lawngrass using the same mat-like lawngrass.

DETAILED DESCRIPTION OF THE INVENTION

Figure 1:
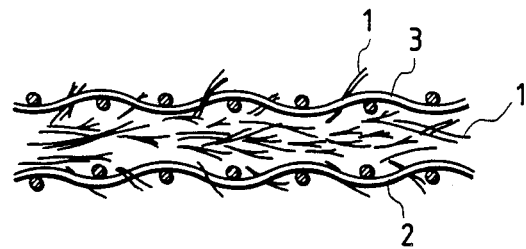
FIG. 1 is a sectional view showing mat-like lawngrass for transplantation according to the present invention.

Mat-like lawngrass for transplantation according to the present invention can be manufactured by cutting lawngrass grown on a lawngrass field or the like to pieces (sods) having an adequate size or area, then fraying out the sods into runner-like lawngrass using a fraying machine, then setting the frayed-out sods in a suitably dispersed fashion on a net, then spraying such chemicals as a rooting accelerator, a vegetation accelerator, an anti-wilting agent, a fungicide, an insecticide and a fertilizer over the laid runner-like lawngrass, and then placing a cover member consisting of a net or a sheet on the lawngrass to sandwich the lawngrass.

According to the present invention, the net becomes unnecessary after suitable vegetation and propagation is obtained from the mat-like lawngrass laid on the ground. Therefore, it suitably consists of a material capable of decaying and decomposing. Suitable examples of the material of the net are staple fiber and cotton fiber. According to the present invention, it is possible to use not only a net but also a net-like material. It is thus possible to use nets capable of being corroded and microorganism-decomposed, for instance metal nets and nets of plastic materials such as polyethylene and polypropylene, depending on the purposes. As the net, a continuous-length one wound into a roll is used.

The mesh size of the net is suitably such as to be sufficient for keeping lawngrass dispersed on the net, and also the mesh size of the ground-side net is such as not to interfere with the transplantation. The mesh size varies with the length of lawngrass sandwiched between nets but is usually about 9 to 18 mm.

It is not essential to use a single net on each of the upper and lower sides of lawngrass, and a suitable number of nets may be used depending on the purpose.

As the cover, the same net as noted above may be used. As the sheet-like cover may be used those having decaying character and also those made of a material soluble to water and capable of being photo-deteriorated and also by oxidization, for instance paper, woven or non-woven cloth and plastic film. These materials may be perforated, if necessary.

The lawngrass, to which the present invention is applicable, as noted before, is lawngrass capable of vegetative propagation, i.e., capable of propagation not by seed propagation but by transplantation. Examples of such lawngrass are zoysiagrasses (*Zoysia* Willd.) and hybrid bermudagrass, etc.

Sods are available in a form obtained by cutting lawngrass densely vegetated in a lawngrass field or the like to a size of 30 cm by 37 cm, for instance. According to the present invention, such lawngrass is frayed out into runner-like lawngrass before being sandwiched between a net and a cover member (the net and cover member being hereinafter collectively referred to as nets). The quantity of lawngrass sandwiched between the nets is different according to the kinds of lawngrass, vegetation period and period of construction, so that it is not particularly limited. As an example, it is preferable to fray out a sod with dimensions of 30 cm by 37 cm and to disperse it over an area which is 3 to 20 times the surface area of the sod. In case of Japanese lawngrass, 5 to 10 times are normally suitable, and in case of hybrid bermudagrass, 10 to 20 times are suitable.

The mat-like lawngrass according to the present invention may be merely in a form of runner-like lawngrass being sandwiched between nets. However, if the upper and lower nets sandwiching the lawngrass between them are coupled together by means of sewing along their ends and, if desired, also at inner portions, lawngrass can be held fixed relative to the nets during transplanting operation of the like. The nets may be coupled together using string at a suitable mesh interval or using metal couplers such as staples as well as by sewing.

The mat-like lawngrass according to the present invention, if manufactured as a continuous-length one having a suitable width and wound into a roll, can be readily transported and need only be unwound when using it. For instance, it may be provided as a roll of lawngrass sheet with a width of 1 m and a length of 50 m. The mat-like lawngrass may be wound by using or without a core. When using a core, it is usually a cylindrical core consisting of a metal or plastic material net and having permeable character. Its diameter, although varying with the length of mat-like lawngrass to be wound on, is suitably about 70 to 100 mm.

In use, the mat-like lawngrass according to the present invention is laid on the surface of ground, on which it is to be transplanted, by unwinding it from the roll, and then it is given cover soil and sprinkled water for growth in the usual way. For laying lawngrass, adjacent mat-like lawngrass pieces may be overlapped by a suitable width. Mat-like lawngrass laid on the ground need only be held using cover soil or the like. When the lawngrass is laid on an inclined ground, the nets are suitably anchored to the ground using pins or the like as an anchor. For the vegetation of lawngrass, the laid mat-like lawngrass with cover soil or the like provided on it may be held covered by a perforated plastic film such as a mulching film for a predetermined period of time.

Now an embodiment of the present invention will be described without any sense of limiting the present invention.

FIG. 1 is a sectional view for explaining mat-like lawngrass A for transplantation according to the present invention. Referring numeral 1 designates runner-like lawngrass, and 2 and 3 nets sandwiching the runner-like lawngrass 1 therebetween. The net 2 is on the ground side when the mat-like lawngrass A for transplantation is laid on the ground.

Figure 2:
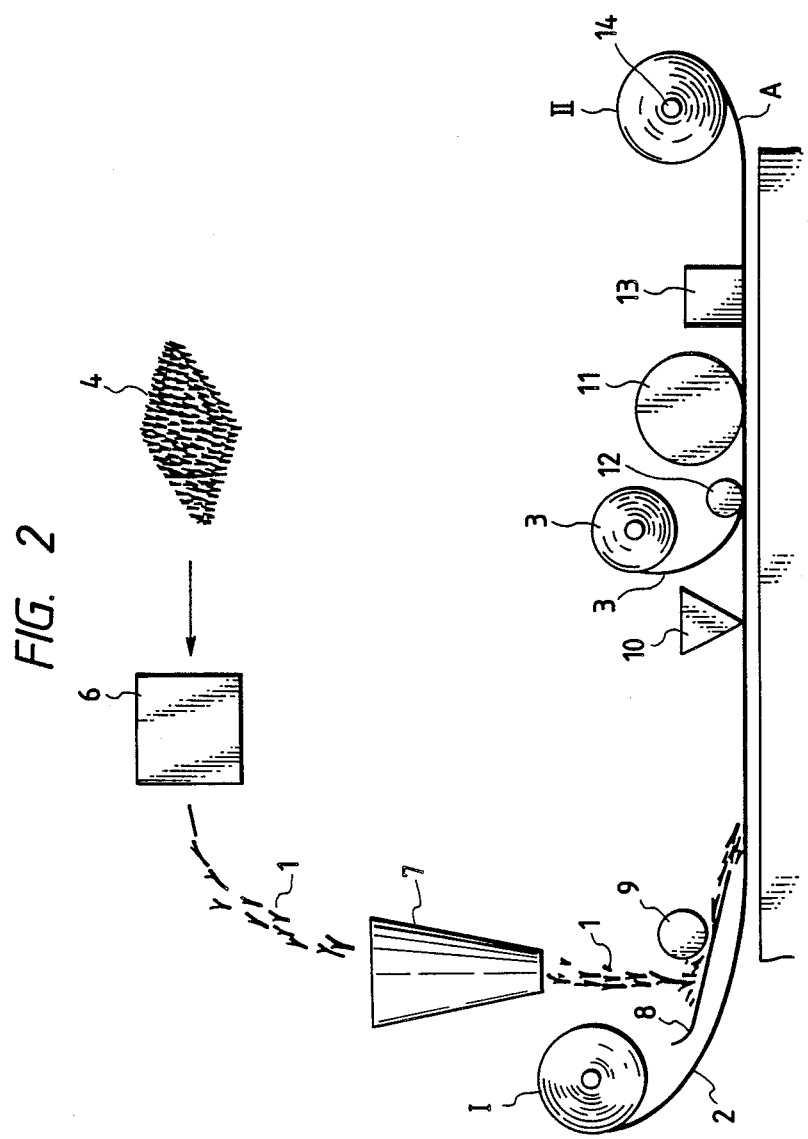
FIG. 2, is a view illustrating a method of manufacturing mat-like lawngrass for transplantation according to the present invention.

Now, an embodiment of the method of manufacturing mat-like lawngrass for transportation according to the present invention will be described with reference to FIG. 2.

A sod 4 with dimensions of 30 cm by 37 cm, obtained in the usual way, is frayed out using a fraying machine 6 into runner-like lawngrass 1, which is then charged into a supply hopper 7. Underneath the supply hopper 7 is disposed a receptacle plate 8 held in an inclined state for receiving the runner-like lawngrass 1 supplied from the supply hopper 7. The runner-like lawngrass 1 falling onto the receptacle plate 8 is supplied by a feed roller 9 in adequate quantities on a net 2. The net 2 is paid off a roll product I which is supported by a suitable rewinder (not shown). It is paid off the roll on the left side in the Figure to proceed underneath the receptacle plate 8 and pass horizontally for a predetermined distance to be taken up as mat-like lawngrass on a core 14 mounted in a take-up unit (not shown) on the right side. Designated at II is a mat-like lawngrass roll obtained in this way.

The net 2, after proceeding underneath the receptacle plate 8, proceeds under chemical supply units 10, and according to the necessity, such chemicals as a rooting accelerator, a vegetation accelerator, an anti-wilting agent, a fungicide, an insecticide, a fertilizer, etc. are sprinkled as desired over the lawn grass 1. Reference numeral 12 is a roller for paying out the net 3 as a cover member.

After passing through the individual process steps noted above, the net 3 placed over the runner-like lawngrass 1 on the net 2 is usually rolled round a take-up core 14 as a mat-like lawngrass A as it is. In accordance with the necessity, however, the resultant system is adequately pressed by a press roller 11, then the upper and lower nets 2 and 3 are coupled together by a sewing unit 13, thus producing mat-like lawngrass A, which is taken up on the take-up core 14. Since the core 14 is a net-like cylinder made of a plastic material, a metal spool may be inserted into the core 14 for the strengthening purpose.

Figure 3:
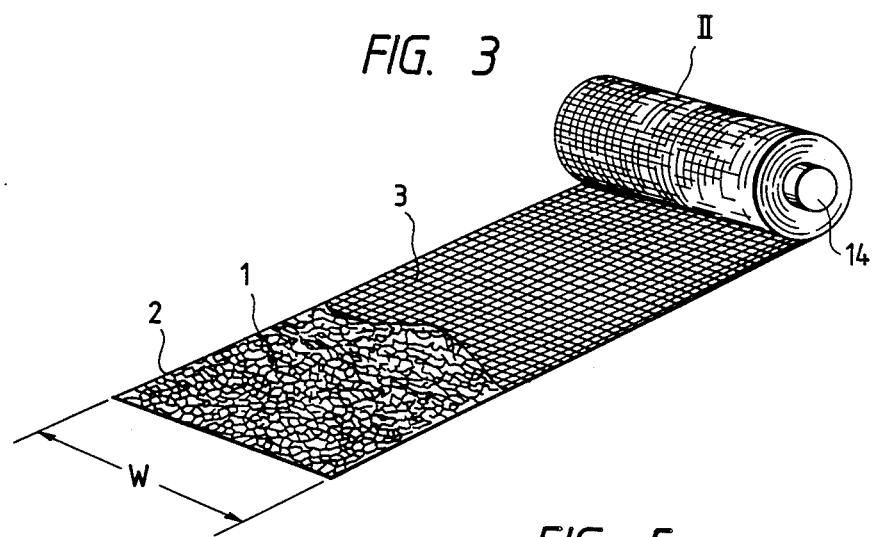
FIG. 3 is a perspective view, partly broken away, showing mat-like lawngrass for transplantation according to the present invention.

FIG. 3 is a fragmentary perspective view showing the mat-like lawngrass A for transplantation manufactured as roll product II by the method described above.

The roll product II may have a suitable size, for instance a roll (with a diameter R of 30 to 50 cm) of mat-like lawngrass having a width W of 1 m and a length of 50 m. As an example, the runner-like lawngrass 1 was dispersed over an area of 1 m by 1.2 m of the net 2 in a quantity corresponding to the quantity of conventional sod (with a dimensions of 37 cm by 30 cm).

Figure 4:
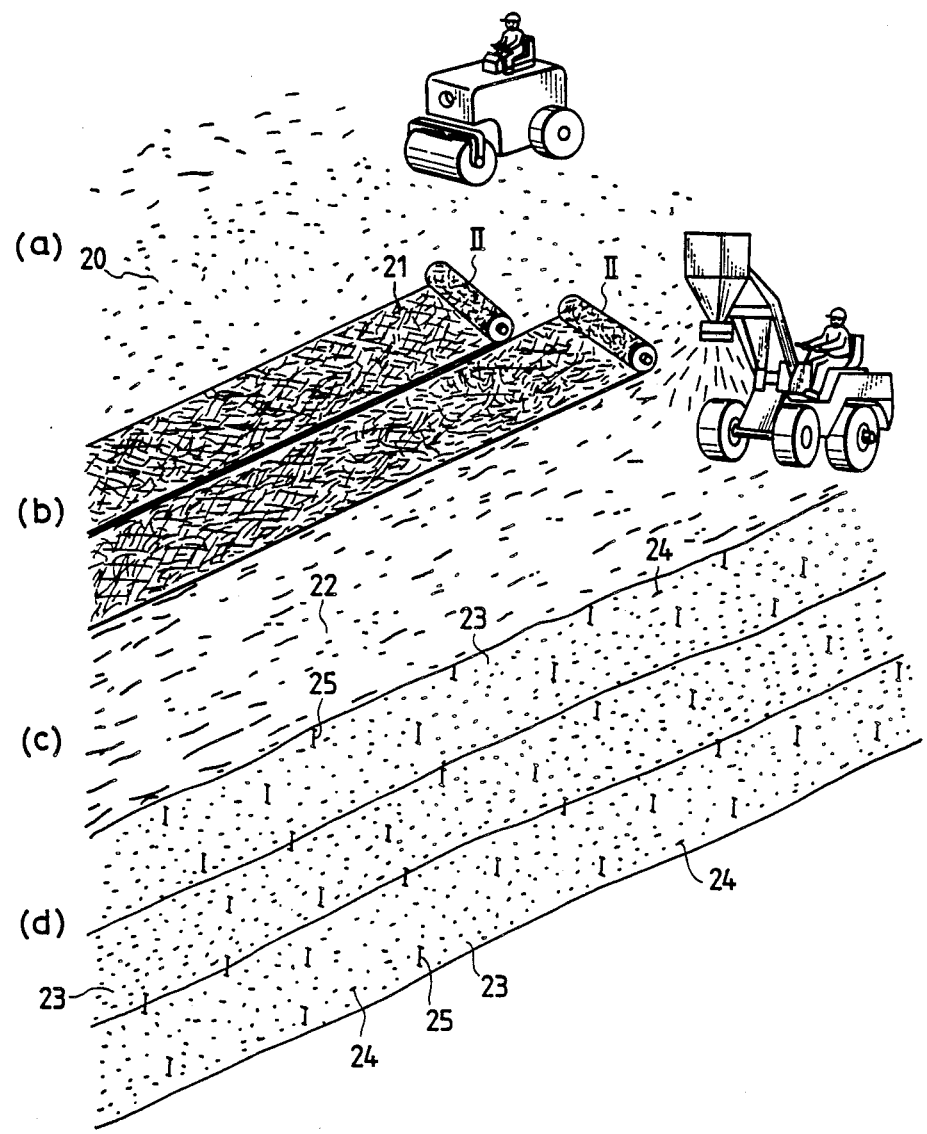
FIG. 4 is a view illustrating a method of transplanting mat-like lawngrass for transplantation according to the present invention.

FIG. 4 is a view for explaining an operation of transplanting the roll product II on a place, on which lawngrass is to be formed and growing the lawngrass there. Referring to the Figure, as shown in (a) ground surface 20 is rolled before transplantation, and then as shown in (b) the roll product II is brought to the rolled ground surface 20 and is laid on the same. Adjacent mat-like lawngrass pieces A are overlapped at least by about 5 cm at each edge 21.

If the ground surface for transplantation is an inclined surface, the mat-like lawngrass A is developed in a direction perpendicular to the contour lines.

It is desirable to develop the roll of mat-like lawngrass A while spraying water containing a rooting accelerator or the like on the developed mat-like lawngrass using a sprayer. Then, cover soil 22 is provided as shown in (c) of FIG. 4. As the cover soil 22, soil which is same kind of the soil usually used for the transplantation of the lawngrass is suitably provided to a thickness of about 5 to 10 mm. The grain size of the soil is suitably as small as possible. It is possible to add an aquagrow agent and fertilizer to the soil, kneed the mixture with water and blow out the resultant paste using a seeder. The soil to be used for covering the mat-like lawngrass A may be heat-treated at suitable temperature to remove out seeds of weeds or harmful insects contained in the soil, thus obtaining good lawngrass. Alternatively, it is possible to use a mixture of heated soil and beat moss.

Figure 5:
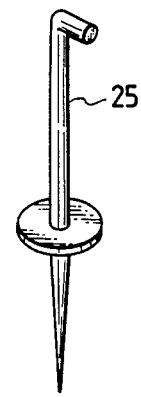
FIG. 5 is a perspective view of an anchor.

Shown in (d) in the Figure is a mulched state, in which the soil cover is covered by perforated plastic films 23 as a mulching film. In this embodiment, perforated plastic film is used, which consists of a polyethylene film with a width of 1 m and 20 cm and formed with a large number of holes 24 of 10 mm in diameter and arranged at a pitch of 10 cm in perpendicular and transverse rows. After placing the film 23 on the cover soil 22, it is secured in position by piercing it with anchors 25 (as shown in FIG. 5) from above at a suitable interval. The mulching with the perforated plastic films is done in order to preserve moisture and temperature necessary for the growth and budding for a predetermined period of time (20 to 90 days). When the lawngrass has been grown to an extent to raise the film 23, the films 23 are removed by taking out the anchors 25. The film 23 may be re-used.

As has been described in the foregoing, while with the prior art lawngrass transplantation process earth gaps remain so that a considerable time, i.e., days and months, is required before uniform lawngrass is obtained, according to the present invention no earth gap is formed from the outset, and uniform growth of lawngrass can be obtained from the outset.

Further, according to the present invention runner-like lawngrass is sandwiched in a suitable quantity and in a dispersed form between a net and a cover member, and thus excellent growth can be obtained with all the lawngrass as points of vegetation. Strong and dense lawngrass thus can be obtained quickly. Further, according to the prior art lawngrass transporting process various weeds are grown afterwards, but according to the present invention such problems are not posed because seeds of weeds and egges of insects attached to lawngrass in the field are removed in the stage of dispersion.

Further, with the prior art process of lawngrass transplantation one person can effect a work over an area of 60 to 100 m$^2$, whereas according to the present invention one person can transplant lawngrass over an average area of 500 to 1,500 m$^2$.

Further, the roll product of mat-like lawngrass for transplantation used according to the present invention can be preserved for long time by covering the laid lawngrass with perforated plastic film. Further, since the roll product is not so bulky, it is very conveniently transported or carried along to the side of transplantation work. For example, a person can lightly carry at least two product rolls of mat-like lawngrass on the shoulders, and this quantity of lawngrass corresponds to lawngrass of area of 120 m$^2$ where lawngrass is turfed and corresponds to lawngrass for one two-ton truck in case of the prior art lawngrass transplantation process.

Further, if sods corresponding to eight large-size trucks (with capacity of 11 tons) are to be transported in the prior art lawngrass transplantation process, according to the present invention only mat-like lawngrass for transplantation corresponding to one middle size truck (with capacity of 4 tons) need be transported. It is thus possible to revolutionary reduce the cost of transportation and improve the operation performance.

The net has an effect of prevention lawngrass and soil or sand thereon from being flow out when rain falls after the work, thus contributing to safe vegetation of lawngrass. After a couple of months, however, it decays in the earth and thus never interferes golf play or the like.

What is claimed is:

1. Mat-like lawngrass for transplantation comprising runner-like grass of a predetermined density or thickness obtained by fraying out sod pieces and sandwiched between a net and a cover member.

2. A mat-like lawngrass for transplantation as claimed in claim 1, wherein said net and cover member are made of a material having a decomposing, deteriorating and/or decaying character.

3. A mat-like lawngrass for transplantation as claimed in claim 1, wherein said lawngrass is vegetation propagation lawngrass.

4. A mat-like lawngrass for transplantation as claimed in claim 3, wherein said vegetation propagation lawngrass is selected from a group consisting of zoysiagrass and hybrid bermudagrass.

5. A mat-like lawngrass for transplantation as claimed in claim 1, wherein a sod is frayed out and dispersed over an area substantially 3 to 20 times the area of said sod.

6. A mat-like lawngrass for transplantation as claimed in claim 1, wherein said net has a mesh size sufficient for keeping the dispersed lawngrass and ineffective to interfere with the transplantation.

7. A mat-like lawngrass for transplantation as claimed in claim 1, wherein said net and cover member and net sandwiching lawngrass are coupled together along their edges and/or in inner portions with respect to the edges.

8. A mat-like lawngrass for transplantation as claimed in claim 7, wherein said mat-like lawngrass roll has a core constituted by a cylindrical member made from a metal or plastic material net and having permeable character.

9. A mat-like lawngrass for transplantation as claimed in claim 1, which has a suitable length and is would into a roll.

10. A mat-like lawngrass for transplantation as claimed in claim 1, wherein said cover member is a net or a sheet.

11. A mat-like lawngrass for transplantation as claimed in claim 1, wherein said cover member is a net.

12. A method of manufacturing mat-like lawngrass for transplantation comprising the steps of
   cutting lawngrass grown on a lawngrass field to sod pieces, fraying out said sod pieces into runner-like lawngrass using a fraying machine,
   dispersing said frayed-out lawngrass at a predetermined density over a net,
   optionally spraying such chemicals as a rooting accelerator, a vegetation accelerator, an anti-wilting agent, an insecticide, a fungicide and a fertilizer over the lawngrass on said net, and then
   covering said lawngrass with a cover member consisting of a net or a sheet to sandwich the lawngrass between said cover member and said net.

13. A method of manufacturing mat-like lawngrass for transplantation as claimed in claim 12, wherein said net and cover member are in the form of rolls and supplied while unwiding said rolls for sandwiching runner-like lawngrass between them to produce a wafer to be taken up into a roll.

14. A method of transplanting lawngrass comprising the steps of
   laying mat-like lawngrass on a ground surface for transplanting lawngrass thereon, wherein said mat-like lawngrass comprises runner-like lawngrass between a net and a cover member; and
   providing cover soil and earth gapping for vegetation of lawngrass.

* * * * *

UNITED STATES PATENT AND TRADEMARK OFFICE
CERTIFICATE OF CORRECTION

PATENT NO. : 4,982,526

DATED : January 8, 1991

INVENTOR(S) : Yoshifumi MIYACHI

It is certified that error appears in the above-identified patent and that said Letters Patent is hereby corrected as shown below:

ON THE TITLE PAGE:

Item [73], change "Turk" to --Turf--.

Signed and Sealed this

Nineteenth Day of May, 1992

Attest:

DOUGLAS B. COMER

Attesting Officer

Acting Commissioner of Patents and Trademarks